US009111487B2

(12) United States Patent
Min et al.

(10) Patent No.: US 9,111,487 B2
(45) Date of Patent: Aug. 18, 2015

(54) DISPLAY DEVICE AND METHOD OF DRIVING THE SAME

(75) Inventors: Ung-Gyu Min, Namyangju-si (KR); Oh-Kyong Kwon, Seoul (KR)

(73) Assignees: Samsung Display Co., Ltd., Yongin (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 485 days.

(21) Appl. No.: 13/609,905

(22) Filed: Sep. 11, 2012

(65) Prior Publication Data

US 2013/0002643 A1 Jan. 3, 2013

Related U.S. Application Data

(62) Division of application No. 12/402,061, filed on Mar. 11, 2009, now Pat. No. 8,289,247.

(30) Foreign Application Priority Data

Sep. 24, 2008 (KR) ........................ 10-2008-0093764

(51) Int. Cl.
*G06F 3/038* (2013.01)
*G09G 3/32* (2006.01)

(52) U.S. Cl.
CPC ............ *G09G 3/3233* (2013.01); *G09G 3/3291* (2013.01); *G09G 2300/0814* (2013.01); *G09G 2300/0819* (2013.01);
(Continued)

(58) Field of Classification Search
CPC ................................ G06F 3/038; G09G 3/325
See application file for complete search history.

(56) References Cited

U.S. PATENT DOCUMENTS 7,262,753 B2 8/2007 Tanghe et al.
2006/0139264 A1 6/2006 Choi et al.
(Continued)

FOREIGN PATENT DOCUMENTS

JP 2003263129 9/2003
JP 2004145279 5/2004
(Continued)

OTHER PUBLICATIONS

Non-Final Office Action issued for related U.S. Appl. No. 12/402,061 dated Apr. 5, 2012.
(Continued)

*Primary Examiner* — Andrew Sasinowski
(74) *Attorney, Agent, or Firm* — H.C. Park & Associates, PLC

(57) ABSTRACT

A display device and a method of driving the same are provided. The display device includes a plurality of display pixels, a plurality of data lines that are connected to the display pixels, and a plurality of sensing lines that are connected to the display pixels. Each display pixel includes: a driving transistor that has a control terminal, an input terminal, and an output terminal; a capacitor that is connected to the control terminal of the driving transistor; a first switching transistor that is connected to the data line and the control terminal of the driving transistor; a light-emitting element that receives a driving current from the driving transistor to emit light; a second switching transistor that is connected between the sensing line and the light-emitting element; and a third switching transistor that is connected between the output terminal of the driving transistor and the light-emitting element.

15 Claims, 7 Drawing Sheets

(52) U.S. Cl.
CPC . *G09G 2300/0866* (2013.01); *G09G 2310/027* (2013.01); *G09G 2310/0262* (2013.01); *G09G 2320/0285* (2013.01); *G09G 2320/043* (2013.01)

(56) References Cited

U.S. PATENT DOCUMENTS

| | | | | |
|---|---|---|---|---|
| 2007/0273621 | A1* | 11/2007 | Yamashita et al. | 345/76 |
| 2007/0296652 | A1* | 12/2007 | Imamura et al. | 345/76 |
| 2008/0030495 | A1 | 2/2008 | Shirasaki et al. | |
| 2008/0297449 | A1* | 12/2008 | Yamashita et al. | 345/76 |

FOREIGN PATENT DOCUMENTS

| | | |
|---|---|---|
| JP | 2006301159 | 11/2006 |
| KR | 1020040025344 | 3/2004 |
| KR | 1020050007486 | 1/2005 |
| KR | 1020070118857 | 12/2007 |
| KR | 10-0846970 | 7/2008 |

OTHER PUBLICATIONS

Notice of Allowance issued for related U.S. Appl. No. 12/402,061 dated Aug. 17, 2012.

* cited by examiner

DISPLAY DEVICE AND METHOD OF DRIVING THE SAME

CROSS REFERENCE TO RELATED APPLICATIONS

This application is a divisional of U.S. patent application Ser. No. 12/402,061, filed on Mar. 11, 2009, and claims priority from and the benefit of Korean Patent Application No. 10-2008-0093764, filed on Sep. 24, 2008, which are hereby incorporated by reference for all purposes as if fully set forth herein.

BACKGROUND OF THE INVENTION

1. Field of the Invention

The present invention relates to a display device and a method of driving the same, and more particularly, to an organic light emitting device and a method of driving the same.

2. Background of the Invention

A pixel of an organic light emitting device includes an organic light emitting element and a thin film transistor (TFT) that drives the same.

The TFT is classified into a polysilicon TFT and an amorphous silicon TFT according to the kind of an active layer. An organic light emitting device using a polysilicon TFT may have high electron mobility, good high frequency operation characteristics, and a low leakage current. However, it may not be easy to uniformly form characteristics of a semiconductor that is included in a TFT within a display device in a process of manufacturing an active layer with polysilicon. That is, a threshold voltage or mobility of the TFT may be different in each transistor. Accordingly, a luminance deviation may occur between a plurality of pixels that are included in the display device.

As a current flows for a long time period, a threshold voltage of the organic light emitting element may vary. In a p-channel TFT, because the organic light emitting element is positioned at a drain side of the TFT, if a threshold voltage of the organic light emitting element is degraded, a voltage of the drain side of the TFT may be changed. Accordingly, even if the same data voltage is applied to a gate of the TFT, a voltage between a gate and a drain of the TFT may be changed, and thus a non-uniform current may flow to the organic light emitting element. A non-uniform current flow may be a factor of degradation of picture quality of the organic light emitting device.

A hold type of flat panel display device such as an organic light emitting device displays a fixed image for a predetermined time period, for example for one frame, regardless of whether a still picture or a motion picture is shown. For example, when displaying an object that continuously moves, the object may stay at a specific position for one frame and may stay at a position to which the object moves after a time period of one frame in a next frame. Thus, a motion of the object may be discretely displayed. Because a time period of one frame is a time period in which an afterimage is sustained, even if a motion of the object is displayed in this way, a motion of the object may be continuously viewed.

However, when viewing a continuously moving object through a screen, because a line of sight of a person continuously moves along a motion of the object, the line of sight of a person may collide with a discrete display method of the display device and thus a blurring phenomenon of a screen may occur. For example, it is assumed that the display device displays images as an object stays at a position A in a first frame and at a position B in a second frame. In the first frame, a line of sight of a person moves from the position A to the position B along an estimated movement path of the object. However, the object is not actually displayed at an intermediate position, just at the positions A and B.

Finally, because luminance that is recognized by a person for the first frame is an integrated value of luminance of pixels in a path between the position A and the position B, i.e., an average value between luminance of an object and luminance of a background, an object may be blurredly viewed.

Because a degree in which an object is blurredly viewed in a hold type of display device may be proportional to a time period in which the display device sustains the display, a so-called impulse driving method in which an image is displayed for only a partial time period within one frame and a black color is displayed for the remaining time period may be used.

SUMMARY OF THE INVENTION

The present invention provides a display device and a method of driving the same having advantages of preventing non-uniformity of luminance between pixels from occurring even if threshold voltages and electric field effect mobility of driving transistors are not uniform in an organic light emitting device of an impulse driving method, and compensating degradation of a threshold voltage of an organic light emitting element.

Additional features of the invention will be set forth in the description which follows, and in part will be apparent from the description, or may be learned by practice of the invention.

The present invention discloses a display device including: a plurality of display pixels; a plurality of data lines that are connected to the display pixels; and a plurality of sensing lines that are connected to the display pixels, each display pixel includes a driving transistor including a control terminal, an input terminal, and an output terminal; a capacitor connected to the control terminal of the driving transistor; a first switching transistor connected to the data line and the control terminal of the driving transistor; a light-emitting element to receive a driving current from the driving transistor to emit light; a second switching transistor connected between the sensing line and the light-emitting element; and a third switching transistor connected between the output terminal of the driving transistor and the light-emitting element.

The present invention also discloses a method of driving a display device including a sensing line, a light-emitting element, a capacitor, and a driving transistor that is connected to the capacitor, the driving transistor including a control terminal, an input terminal, and an output terminal, the method including: connecting the control terminal and the output terminal; connecting the control terminal and the output terminal to a ground voltage and then disconnecting the control terminal and the output terminal from the ground voltage; sensing a first voltage of the control terminal through the sensing line; and calculating a threshold voltage of the driving transistor based on the first voltage.

The present invention also discloses a method of driving a display device including a sensing line, a light-emitting element, a capacitor, and a driving transistor, the driving transistor including a control terminal that is connected to the capacitor, an input terminal, and an output terminal, including: connecting a data voltage to the control terminal; connecting a reference voltage to the sensing line; disconnecting the control terminal from the data voltage and connecting the light-emitting element to the output terminal; disconnecting the sensing line from the reference voltage and connecting the sensing line to an anode terminal of the light-emitting element; disconnecting the light-emitting element from the output terminal; sensing an anode voltage of the light-emitting element through the sensing line when the light-emitting element is disconnected from the output terminal; and calculating a transition degree of a threshold voltage of the light-emitting element by comparing the anode voltage of the light-emitting element with a reference voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
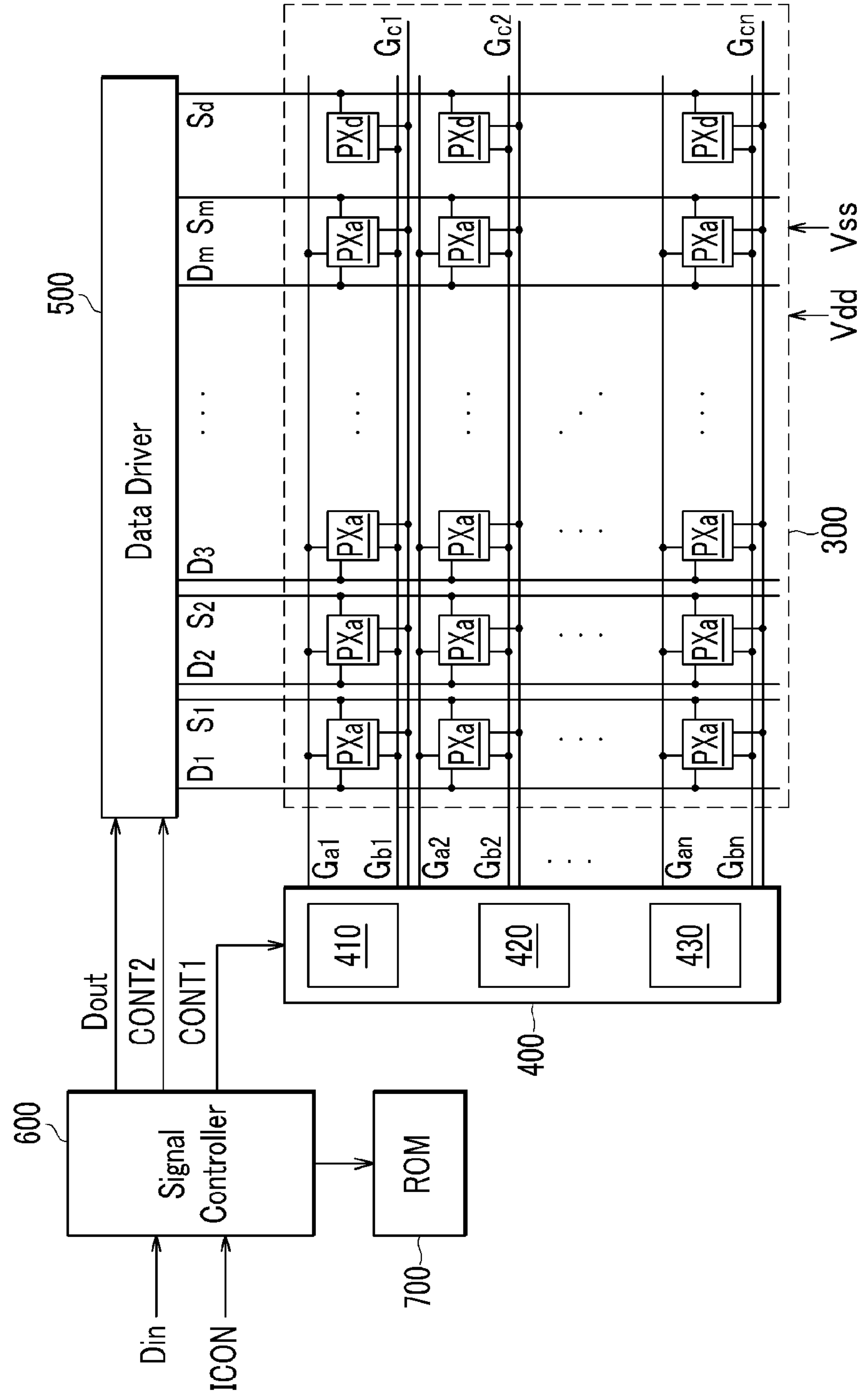
FIG. 1 is a block diagram of an organic light emitting device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

An organic light emitting device according to an exemplary embodiment of the present invention is described with reference to FIG. 1 and FIG. 2.

Figure 2:
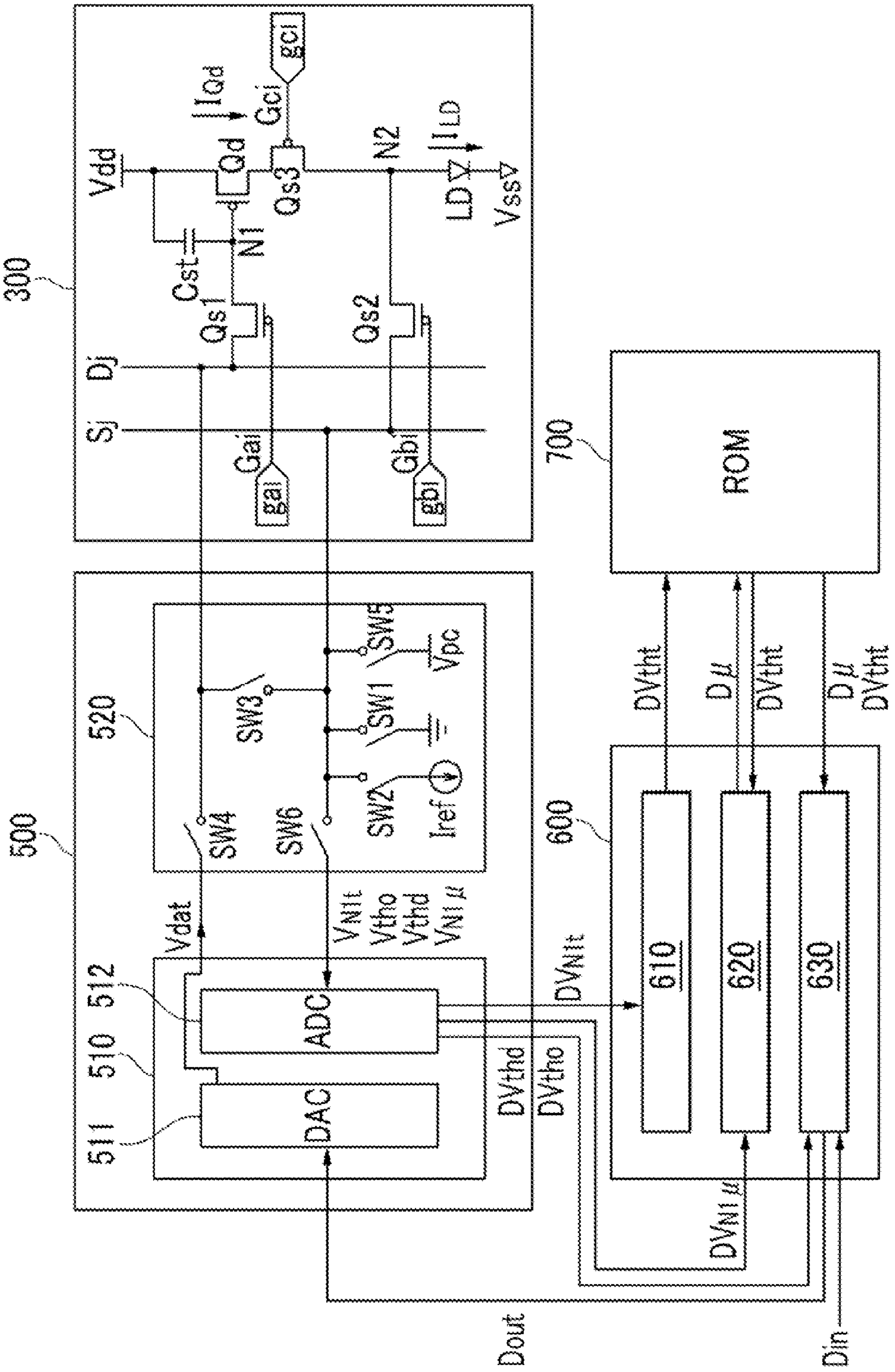
FIG. 2 is an equivalent circuit diagram of a pixel in an organic light emitting device according to an exemplary embodiment of the present invention.

FIG. 1 is a block diagram of an organic light emitting device according to an exemplary embodiment of the present invention, and FIG. 2 is an equivalent circuit diagram of a display pixel in an organic light emitting device according to an exemplary embodiment of the present invention.

Referring to FIG. 1, the organic light emitting device includes a display panel 300, a scanning driver 400, a data driver 500, a signal controller 600, and a read-only memory (ROM) 700.

The display panel 300 includes a plurality of signal lines $G_{a1}$-$G_{an}$, $G_{b1}$-$G_{bn}$, $G_{c1}$-$G_{cn}$, $S_1$-$S_m$, $S_d$, and $D_1$-$D_m$, a plurality of voltage lines (not shown), and a plurality of display pixels PXa and dummy pixels PXd that are connected thereto and that are arranged approximately in a matrix form.

The signal lines $G_{a1}$-$G_{an}$, $G_{b1}$-$G_{bn}$, $G_{c1}$-$G_{cn}$, $S_1$-$S_m$, $S_d$, and $D_1$-$D_m$ include a plurality of first scanning signal lines $G_{a1}$-$G_{an}$ that transfer a first scanning signal, a plurality of second scanning signal lines $G_{b1}$-$G_{bn}$ that transfer a second scanning signal, a plurality of third scanning signal lines $G_{c1}$-$G_{cn}$ that transfer a third scanning signal, a plurality of sensing lines $S_1$-$S_m$ and $S_d$ that transfer a sensing data signal, and a plurality of data lines $D_1$-$D_m$ that transfer an image data signal. The first scanning signal lines $G_{a1}$-$G_{an}$, the second scanning signal lines $G_{b1}$-$G_{bn}$, and the third scanning signal lines $G_{c1}$-$G_{cn}$ extend in a row direction and are substantially parallel to each other, and the sensing lines $S_1$-$S_m$ and $S_d$ and the data lines $D_1$-$D_m$ extend in a column direction and are substantially parallel to each other.

The display pixel PXa is a pixel that displays an actual image, and is connected to the first to third scanning signal lines $G_{a1}$-$G_{an}$, $G_{b1}$-$G_{bn}$, and $G_{c1}$-$G_{cn}$, the sensing lines $S_1$-$S_m$, and the data lines $D_1$-$D_m$. In contrast, the dummy pixel PXd is a pixel that does not display an actual image and is connected only to the second scanning signal lines $G_{b1}$-$G_{bn}$, the third scanning signal lines $G_{c1}$-$G_{cn}$, and the sensing line $S_d$.

The voltage line includes a driving voltage line (not shown) that transfers a driving voltage.

As shown in FIG. 2, each display pixel PXa includes an organic light emitting element LD, a driving transistor Qd, a capacitor Cst, and first, second, and third switching transistors Qs1-Qs3.

The driving transistor Qd has an output terminal, an input terminal, and a control terminal. The control terminal of the driving transistor Qd is connected to the capacitor Cst and the first switching transistor Qs1 at a contact point N1, the input terminal thereof is connected to a driving voltage Vdd, and the output terminal thereof is connected to the second and third switching transistors Qs2 and Qs3.

One end of the capacitor Cst is connected to the driving transistor Qd at the contact point N1, and the other end thereof is connected to the driving voltage Vdd.

The first switching transistor Qs1 operates in response to a first scanning signal $g_{ai}$, the second switching transistor Qs2 operates in response to a second scanning signal $g_{bi}$, and the third switching transistor Qs3 operates in response to a third scanning signal $g_{ci}$.

The first switching transistor Qs1 is connected between the data line Dj and the contact point N1, the second switching transistor Qs2 is connected between the sensing line Sj and a contact point N2, and the third switching transistor Qs3 is connected between the driving transistor Qd and the contact point N2.

The driving transistor Qd and the first to third switching transistors Qs1, Qs2, and Qs3 are p-channel electric field effect transistors. The electric field effect transistor includes, for example, a TFT, and may include polysilicon.

An anode and a cathode of the organic light emitting element LD are connected to the third switching transistor Qs3 and a common voltage Vss, respectively. The organic light emitting element LD displays an image by emitting light with different intensity according to a magnitude of a current $I_{LD}$ that is supplied by the driving transistor Qd through the third switching transistor Qs3, and a magnitude of the current $I_{LD}$ depends on a magnitude of a voltage between the control terminal and the input terminal of the driving transistor Qd.

The dummy pixel PXd is formed at one side of the display panel 300. Like the display pixel PXa, the dummy pixel PXd may include the organic light emitting element LD, the driving transistor Qd, the capacitor Cst, and the first, second, and third switching transistors Qs1-Qs3.

Referring again to FIG. 1, the scanning driver 400 includes a first scanning driver 410 that is connected to the first scanning signal lines $G_{a1}$-$G_{an}$ of the display panel 300, a second scanning driver 420 that is connected to the second scanning signal lines $G_{b1}$-$G_{bn}$, and a third scanning driver 430 that is connected to the third scanning signal lines $G_{c1}$-$G_{cn}$. The first to third scanning drivers 410, 420, and 430 apply the first scanning signal $g_{ai}$, the second scanning signal $g_{bi}$, and the third scanning signal $g_{ci}$ consisting of a combination of a high voltage Von and a low voltage Voff to the first scanning signal lines $G_{a1}$-$G_{an}$, the second scanning signal lines $G_{b1}$-$G_{bn}$, and the third scanning signal lines $G_{c1}$-$G_{cn}$, respectively.

The high voltage Von may intercept the first to third switching transistors Qs1-3, and the low voltage Voff may electrically connect the first to third switching transistors Qs1-3.

The data driver 500 includes a basic circuit portion 510 and a switching circuit portion 520.

The basic circuit portion 510 includes a digital-to-analog converter 511 and an analog-to-digital converter 512.

The digital-to-analog converter 511 receives a digital output image signal Dout for each row of display pixels PXa, converts the digital output image signal Dout to an analog data voltage Vdat, and applies the analog data voltage Vdat to the data lines $D_1$-$D_m$. The analog-to-digital converter 512 receives sensing data signals $V_{N1t}$, $V_{N1\mu}$, Vtho, and Vthd from each display pixel PXa through the sensing line Sj, and converts and outputs the sensing data signals $V_{N1t}$, $V_{N1\mu}$, Vtho, and Vthd to digital values $DV_{N1t}$, $DV_{N1\mu}$, DVtho, and DVthd, respectively.

The switching circuit portion 520 includes a first switch SW1 that switches the second switching transistor Qs2 and a ground voltage, a second switch SW2 that switches the second switching transistor Qs2 and a reference current source Iref, a third switch SW3 that switches the sensing line Sj and the data line Dj, a fourth switch SW4 that switches the data line Dj and the digital-to-analog converter 511, a fifth switch SW5 that switches the sensing line Sj and a precharging voltage Vpc, and a sixth switch SW6 that switches the sensing line Sj and the analog-to-digital converter 512.

The signal controller 600 controls operations of the scanning driver 400 and the data driver 500, receives an input image signal Din, corrects the input image signal Din according to characteristics of the driving transistor Qd and characteristics of the organic light emitting element LD, and outputs the corrected input image signal Din as an output image signal Dout.

The signal controller 600 includes a first calculation unit 610, a second calculation unit 620, and an image signal correction unit 630.

The first calculation unit 610 receives a first sensing data signal $V_{N1t}$ that is sensed in the display pixel PXa in a digital form $DV_{N1t}$ through the analog-to-digital converter 512, and calculates a threshold voltage DVtht of the driving transistor Qd based on the first digital sensing data signal $DV_{N1t}$.

The second calculation unit 620 receives a second sensing data signal $V_{N1\mu}$ that is sensed in the display pixel PXa in a digital form $DV_{N1\mu}$ through the analog-to-digital converter 512, and calculates electric field effect mobility Dμ of the driving transistor Qd based on the second digital sensing data signal $DV_{N1\mu}$.

Figure 3:
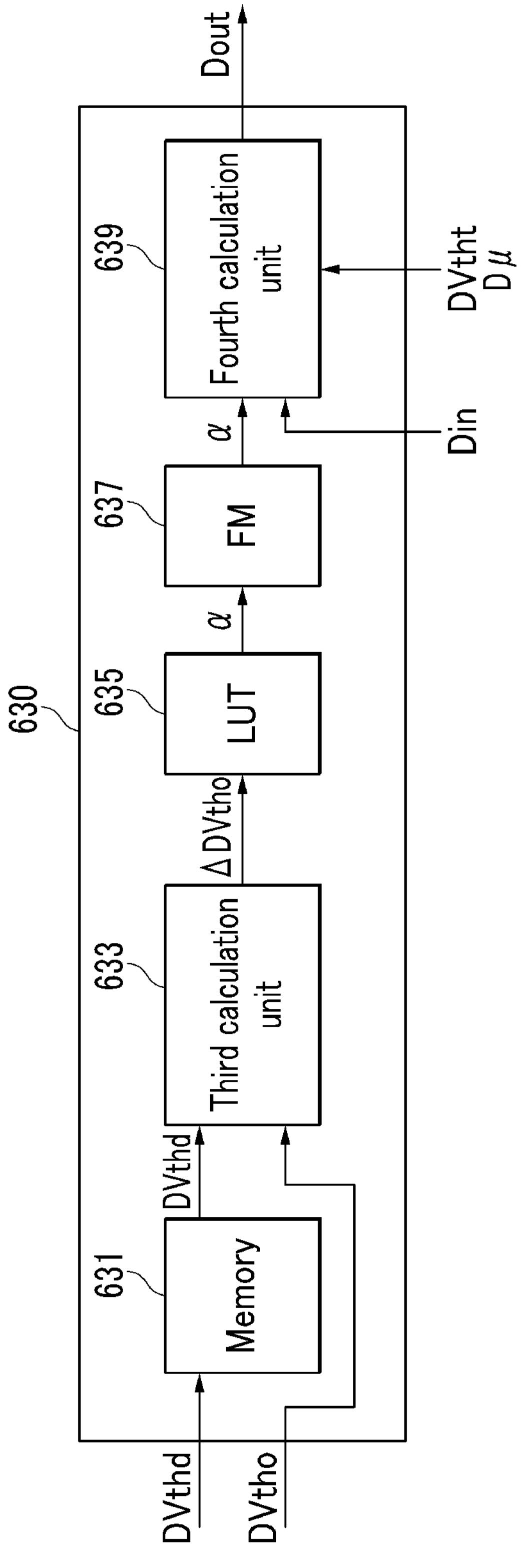
FIG. 3 is a block diagram showing an image signal correction unit of an organic light emitting device according to an exemplary embodiment of the present invention.

Referring to FIG. 3, the image signal correction unit 630 corrects an input image signal Din and outputs the corrected input image signal Din as an output image signal Dout, and includes a memory 631, a third calculation unit 633, a lookup table 635, a frame memory 637, and a fourth calculation unit 639.

The memory 631 receives and stores a third sensing data signal Vthd that is sensed in the dummy pixel PXd, i.e., a threshold voltage Vthd of the organic light emitting element LD, with a digital value DVthd through the analog-to-digital converter 512.

The third calculation unit 633 receives a fourth sensing data signal Vtho that is sensed in the display pixel PXa, i.e., a threshold voltage of the organic light emitting element LD, in a digital form DVtho through the analog-to-digital converter 512, and calculates and outputs a difference value ΔDVtho between the digital fourth sensing data signal DVtho and the third sensing data signal DVthd.

The lookup table 635 stores a degradation factor α representing a degradation degree of the organic light emitting element LD of the display pixel PXa according to the difference value ΔDVtho. In this case, the lookup table 630 stores a degradation factor α having a luminance value of 100% when the difference value ΔDVtho is 0 and having a luminance value that decreases in an exponential function form as the difference value ΔDVtho increases.

The frame memory 637 stores a degradation factor α of each display pixel PXa and outputs the corresponding degradation factor α according to the corresponding display pixel PXa.

The fourth calculation unit 639 compensates the input image signal Din based on a degradation factor α of the corresponding display pixel PXa, a threshold voltage DVtht of the driving transistor Qd, and electric field effect mobility Dμ of the driving transistor Qd, thereby calculating an output image signal Dout.

Here, the memory 631 stores the fourth sensing data signal DVtho as well as the third sensing data signal DVthd, and may output the stored third sensing data signal DVthd and fourth sensing data signal DVtho to the third calculation unit 633. Further, the third calculation unit 633 may be omitted, and the lookup table 635 may store a degradation factor α according to the third sensing data signal DVthd and the fourth sensing data signal DVtho.

The ROM 700 stores a threshold voltage DVtht and electric field effect mobility Dμ of the driving transistor Qd that are sensed in each display pixel PXa and transfers the stored threshold voltage DVtht and electric field effect mobility Dμ to the image signal correction unit 630.

Each of the driving devices 400, 500, 600, and 700 may be directly mounted on the display panel 300 in at least one integrated circuit (IC) chip form, may be mounted on a flexible printed circuit film (not shown) to be attached to the display panel 300 in a tape carrier package (TCP) form, or may be mounted on a separate printed circuit board (PCB) (not shown). Alternatively, the driving devices 400, 500, 600, and 700 together with the signal lines $G_{a1}$-$G_{an}$, $G_{b1}$-$G_{bn}$, $G_{c1}$-$G_{cn}$, $S_1$-$S_m$, $S_d$, and $D_1$-$D_m$ and the transistors Qs1-Qs3 and Qd may be integrated with the display panel 300. Further, the driving devices 400, 500, 600, and 700 may be integrated into a single chip, and in this case, at least one of them or at least one circuit element constituting them may be formed at the outside of the single chip.

A method in which the fourth calculation unit 639 of the organic light emitting device compensates an input image signal according to characteristics of a driving transistor and an organic light emitting element is now described in detail.

In FIG. 2, a current $I_{QD}$ flowing to the driving TFT Qd is represented by Equation 1.

$$I_{QD} = \frac{1}{2}\mu C_{OX}\frac{W}{L}(Vsg - |Vtht|)^2 \quad \text{(Equation 1)}$$

where μ is electric field effect mobility, $C_{OX}$ is capacity of a gate insulating layer, W is a channel width of the driving transistor Qd, L is a channel length of the driving transistor Qd, and Vsg is a voltage difference between the control terminal and the input terminal between the driving transistor Qd.

In Equation 1, in consideration of compensation due to degradation of the organic light emitting element LD and a characteristic deviation of the driving transistor Qd, a maximum current Imax on a gray basis is represented by Equation 2.

$$\frac{100}{100-\alpha} \times \frac{\text{corresponding gray value}}{2^n - 1} \times Imax = \frac{1}{2} \times \mu C_{OX}\frac{W}{L} \times (Vs - Vg - |Vtht|)^2 \quad \text{(Equation 2)}$$

In Equation 2, n is the quantity of bits of an input image signal. A voltage Vg that is applied to the control terminal of the driving transistor Qd is represented by Equation 3.

$$Vg = Vs - \sqrt{\frac{100}{100-\alpha}} \times \sqrt{\frac{\text{corresponding gray value}}{2^n - 1}} \times \sqrt{\frac{2Imax}{\mu C_{OX}\frac{W}{L}}} - |Vtht| \quad \text{(Equation 3)}$$

Therefore, the voltage Vg that is applied to the control terminal of the driving transistor Qd, i.e., a data voltage Vdat in each gray of each display pixel PXa, can be obtained when knowing a degradation factor α of the organic light emitting element LD, electric field effect mobility μ of the driving transistor Qd, and a threshold voltage Vtht of the driving transistor Qd. That is, in Equation 3, a data voltage Vdat to be applied in each gray of each pixel PXa is determined. However, actually, because the data voltage Vdat is an analog voltage that is selected according to an output image signal Dout that is output from the signal controller 600, the data voltage Vdat corrects the input image signal Din to the output image signal Dout to correspond to Equation 3. Such a process is performed in the fourth calculation unit 639.

A method of obtaining a threshold voltage Vtht of a driving transistor Qd of each display pixel PXa in an organic light emitting device according to an exemplary embodiment of the present invention is described with reference to FIG. 1, FIG. 2, FIG. 4, and FIG. 5.

Figure 4:
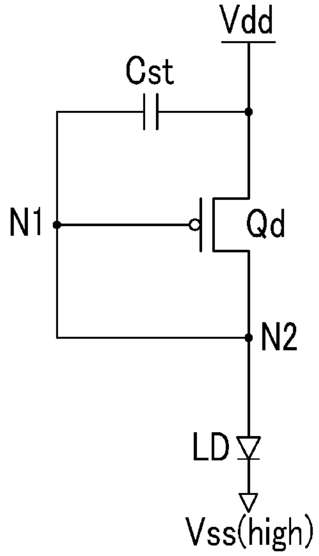
FIG. 4 and FIG. 5 are circuit diagrams of a pixel for obtaining a threshold voltage of a driving transistor in an organic light emitting device according to an exemplary embodiment of the present invention.
Figure 5:
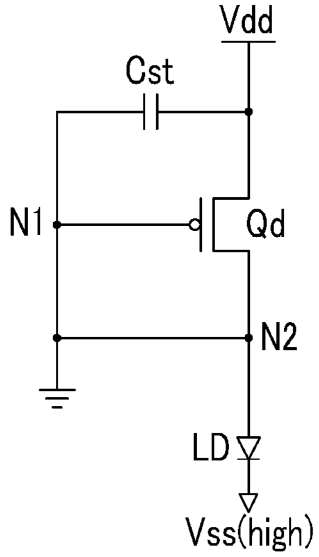

FIG. 4 and FIG. 5 are equivalent circuit diagrams of a display pixel of an organic light emitting device according to an exemplary embodiment of the present invention before production thereof is completed, or before an actual display operation is performed.

When forming the first scanning signal $g_{ai}$, the second scanning signal $g_{bi}$, and the third scanning signal $g_{ci}$ in a low voltage Voff, electrically connecting the third switch SW3, and applying a predetermined high voltage to the common voltage Vss, the first to third switching transistors Qs1-Qs3 are electrically connected and the organic light emitting element LD sustains a non-light emitting state, as shown in FIG. 4.

Thereafter, when the first switch SW1 is electrically connected, the first switch SW1 has a state of FIG. 5. Thereafter, after the first switch SW1 is disconnected again, when the sixth switch SW6 is electrically connected, a voltage of the contact point N1, i.e., the first sensing data signal $V_{N1t}$, is input to the analog-to-digital converter 512 through the sensing line Sj. The analog-to-digital converter 512 converts the first sensing data signal $V_{N1t}$ and outputs the first sensing data signal $V_{N1t}$ to a digital value $DV_{Nt}$. The first calculation unit 610 receives the first sensing data signal $DV_{Nt}$ to calculate and output a threshold voltage DVtht of the driving transistor Qd. The calculated threshold voltage DVtht of the driving transistor Qd is stored in a ROM 700.

As shown in FIG. 5, when the control terminal and the output terminal of the driving transistor Qd are connected to the ground voltage and then are disconnected again, the driving transistor Qd is diode-connected. Accordingly, the threshold voltage Vtht of the driving transistor Qd is obtained by Equation 4.

$$|Vtht| = Vdd - V_{N1t} \quad \text{(Equation 4)}$$

The first calculation unit 610 is calculated by Equation 4. For convenience, Equation 4 is represented with an analog voltage value.

A method of obtaining electric field effect mobility μ of the driving transistor Qd of each display pixel PXa in an organic light emitting device according to an exemplary embodiment of the present invention is now described with reference to FIG. 6.

Figure 6:
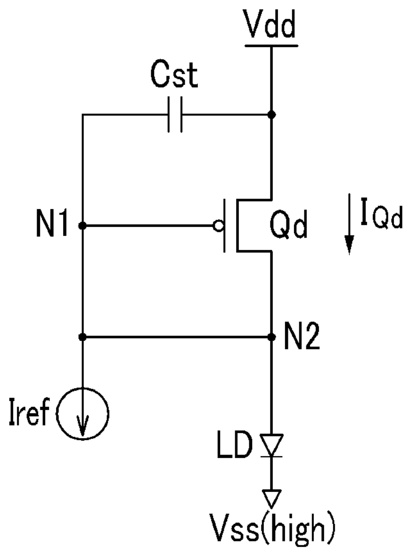
FIG. 6 is a circuit diagram of a pixel for obtaining electric field effect mobility of a driving transistor in an organic light emitting device according to an exemplary embodiment of the present invention.

FIG. 6 is an equivalent circuit diagram of a display pixel of an organic light emitting device according to an exemplary embodiment of the present invention before production is completed, i.e., before an actual display operation is performed.

The first scanning signal $g_{ai}$, the second scanning signal $g_{bi}$, and the third scanning signal $g_{ci}$ are formed in a low voltage Voff, the second and third switches SW2 and SW3 are electrically connected, and a predetermined high voltage is applied to the common voltage Vss. Accordingly, as shown in FIG. 6, the first to third switching transistors Qs1-Qs3 are turned on and the organic light emitting element LD sustains a non-light emitting state. Further, a reference current Iref is flowed to the driving TFT Qd. Thereafter, when the sixth switch SW is turned on, a voltage of the contact point N1, i.e., the second sensing data signal $V_{N1\mu}$, is input to the analog-to-digital converter 512 through the sensing line Sj. The analog-to-digital converter 512 converts the second sensing data signal $V_{N1\mu}$ and outputs the second sensing data signal $V_{N1\mu}$ to the digital value $DV_{N1\mu}$. The second calculation unit 620 receives the second sensing data signal $DV_{N1}$ to calculate and output electric field effect mobility Dμ of the driving transistor Qd. The calculated electric field effect mobility Dμ of the driving transistor Qd is stored in the ROM 700.

In the circuit of FIG. 6, a reference current Iref flowing to the driving TFT Qd is represented by Equation 5.

$$Iref = \frac{1}{2}\mu C_{OX}\frac{W}{L}(Vs - Vg - |Vtht|)^2 \quad \text{(Equation 5)}$$

Equation 6 is obtained from Equation 5.

$$\sqrt{\frac{2Iref}{\mu Cox\frac{W}{L}}} = Vs - Vg - |Vtht| \quad \text{(Equation 6)}$$

where Vs is a driving voltage Vdd, Vtht is obtained by Equation 4, and Vg is a second sensing data signal $V_{N1\mu}$. The second calculation unit 620 is represented by Equation 6, and Equation 6 is represented with an analog voltage value for convenience.

A process of obtaining a threshold voltage DVtht and electric field effect mobility Dμ of the driving transistor Qd is performed for all display pixels PXa at a step before the display device is completed as a product, and may be performed only one time. Thereafter, each of the threshold voltage DVtht and the electric field effect mobility Dμ of the driving transistor Qd is stored in the ROM 700 and is read whenever correcting the input image signal Din. Accordingly, even if characteristics of the transistor Qd are different in each display pixel PXa of the display device, in consideration of different characteristics of the transistor Qd, a data voltage Vdat to be applied to each display pixel PXa is determined and thus luminance of each display pixel PXa is uniformly sustained.

A method of obtaining a display operation of such an organic light emitting device and a degradation factor α of an organic light emitting element is described with reference to FIG. 1, FIG. 2, FIG. 7, FIG. 8, FIG. 9, and FIG. 10.

Figure 7:
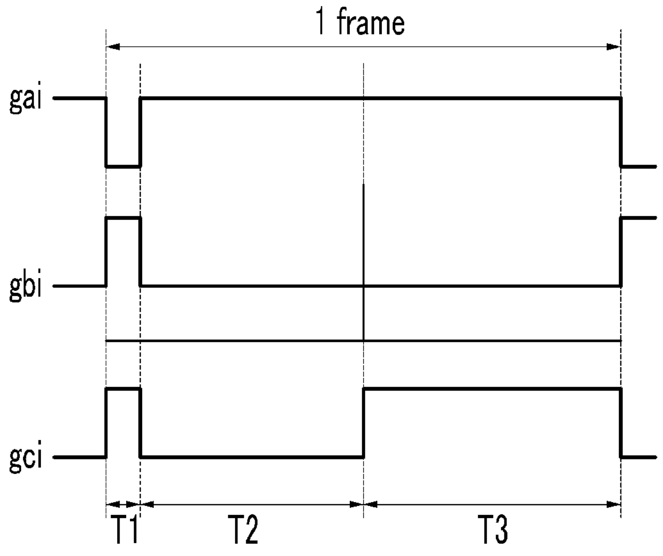
FIG. 7 is an example of a waveform diagram showing a driving signal that is applied to one row of pixels in an organic light emitting device according to an exemplary embodiment of the present invention.
Figure 8:
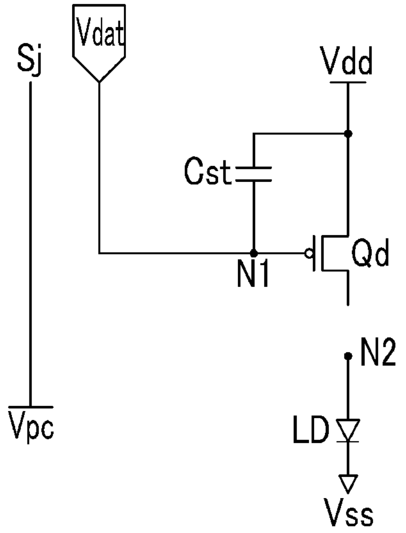
FIG. 8, FIG. 9, and FIG. 10 are equivalent circuit diagrams of a pixel in each period that is shown in FIG. 7.
Figure 9:
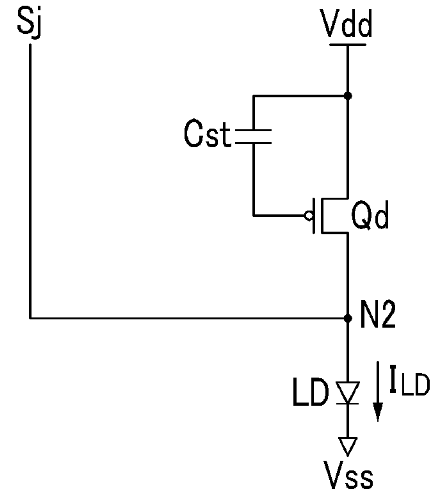
Figure 10:
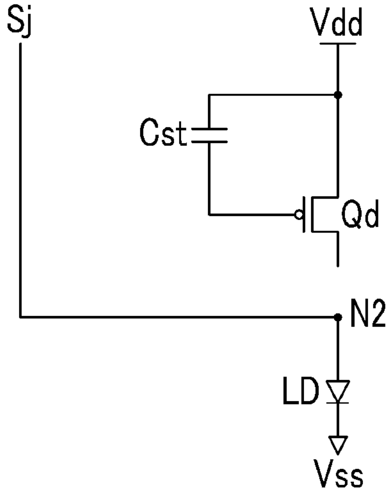

FIG. 7 shows an example of a waveform diagram showing a driving signal that is applied to one row of pixels in an organic light emitting device according to an exemplary embodiment of the present invention, and FIG. 8, FIG. 9, and FIG. 10 are equivalent circuit diagrams of a pixel in each period that is shown in FIG. 7.

Referring to FIG. 1 and FIG. 2, the signal controller 600 receives an input image signal Din and an input control signal ICON that controls the display of the input image signal Din from an external graphics controller (not shown). The input image signal Din includes luminance information of each display pixel PXa, and luminance thereof has grays of the given quantity, for example, $1024=2^{10}$, $256=2^8$, or $64=2^6$. The input control signal ICON includes, for example, a vertical synchronization signal, a horizontal synchronization signal, a main clock signal, and a data enable signal.

The signal controller 600 corrects the input image signal Din based on the input image signal Din and the input control signal ICON and generates a scanning control signal CONT1 and a data control signal CONT2. The signal controller 600 sends the scanning control signal CONT1 to the scanning driver 400 and sends the data control signal CONT2 and an output image signal Dout to the data driver 500.

The scanning control signal CONT1 includes three control signals that control the first to third scanning drivers 410, 420, and 430, and each control signal may include a scanning start signal STV that instructs the scanning start, at least one clock signal that controls an output period of a high voltage Von, and an output enable signal OE that limits a sustain time period of the high voltage Von.

The data control signal CONT2 includes a horizontal synchronization start signal that notifies the transmission start of a digital image signal Dout for one row of display pixels PXs, and a data clock signal HCLK and a load signal that apply an analog data voltage to the data lines $D_1$-$D_m$.

The scanning driver 400 changes a voltage of the first to third scanning signals to a high voltage Von or a low voltage Voff according to the scanning control signal CONT1 from the signal controller 600.

According to the data control signal CONT2 from the signal controller 600, the data driver 500, particularly the basic circuit portion 510, receives a digital output image signal Dout for each row of display pixels PXa, converts the output image signal Dout to an analog data voltage Vdat, and then applies the analog data voltage Vdat to the data lines $D_1$-$D_m$. The data driver 500 outputs a data voltage Vdat for one row of display pixels PXa for one horizontal period 1H.

Hereinafter, a specific row of pixels, for example an i-th row of pixels, is described.

Referring to FIG. 7, the scanning driver 400 changes a voltage of the first scanning signal $g_{ai}$ that is applied to the first scanning signal line $G_{ai}$ to a low voltage Voff according to the scanning control signal CONT1 from the signal controller 600 and changes a voltage of the second scanning signal $g_{bi}$ that is applied to the second scanning signal line $G_{bi}$ and a voltage of the third scanning signal $g_{ci}$ that is applied to the third scanning signal line $G_{ci}$ to a high voltage Von. The fifth switch SW5 is electrically connected.

Accordingly, as shown in FIG. 8, the first switching transistor Qs1 is turned on, and the second and third switching transistors Qs2 and Qs3 are turned off.

When the first switching transistor Qs1 is turned on, a data voltage Vdat is applied to the contact point N1, and a voltage difference between the contact point N1 and the driving voltage Vdd is stored in the capacitor Cst. Therefore, the driving transistor Qd is turned on to flow a current, but because the third switching transistor Qs3 is turned off, the organic light emitting element LD does not emit light. This is called a data writing period T1.

In this case, the sensing line Sj is connected to a precharging voltage Vpc to be precharged, and the precharging voltage Vpc is lower than a threshold voltage Vtho of the organic light emitting element LD.

Next, as shown in FIG. 7, the scanning driver 400 changes a voltage of the first scanning signal $g_{ai}$ that is applied to the first scanning signal line $G_{ai}$ to a high voltage Von according to the scanning control signal CONT1 from the signal controller 600, changes a voltage of the second scanning signal $g_{bi}$ that is applied to the second scanning signal line $G_{bi}$ to a low voltage Voff, and changes a voltage of the third scanning signal $g_{ci}$ that is applied to the third scanning signal line $G_{ci}$ to a low voltage Voff. The fifth switch SW5 is disconnected.

Accordingly, as shown in FIG. 9, the first switching transistor Qs1 is turned off, and the second switching transistor Qs2 and the third switching transistor Qs3 are turned on. In this case, the output terminal of the driving transistor Qd is connected to the organic light emitting element LD, and the driving transistor Qd flows an output current $I_{LD}$ that is controlled by a voltage difference Vsg between the control terminal and the input terminal of the driving transistor Qd to the organic light emitting element LD, and the organic light emitting element LD emits light. This period is a light emitting period T2. In this case, the sensing line Sj is floated. Even if a voltage of the first scanning signal $g_{ai}$ is changed to a high voltage Von and the first switching transistor Qs1 is turned off, a voltage that is charged to the capacitor Cst is continuously sustained for one frame and thus a control terminal voltage of the driving transistor Qd is uniformly sustained.

In this case, because the sensing line Sj is precharged to a precharging voltage Vpc, which is a lower voltage than a threshold voltage Vtho of the organic light emitting element LD in the data writing period T1, even if the sensing line Sj is floated in the light emitting period T2, the voltage does not rise but is sustained to be lower than a threshold voltage Vtht of the organic light emitting element LD. If a voltage of the sensing line Sj is higher than an anode voltage of the organic light emitting element LD, a current flows to the sensing line Sj, not the organic light emitting element LD, and thus desired luminance cannot be sustained.

Next, the scanning driver 400 sustains the first scanning signal $g_{ai}$ that is applied to the first scanning signal line $G_{ai}$ at a high voltage Von, sustains the second scanning signal $g_{bi}$ that is applied to the second scanning signal line $G_{bi}$ at a low voltage Voff, and changes a voltage of the third scanning signal $g_{ci}$ that is applied to the third scanning signal line $G_{ci}$ to a high voltage Von. The fifth switch SW5 sustains a disconnected state.

Accordingly, as shown in FIG. 10, the first switching transistor Qs1 sustains a turned off state, the second switching transistor Qs2 sustains a turned on state, and the third switching transistor Qs3 is turned off. When the third switching transistor Qs3 is turned off, the organic light emitting element LD stops light emission, and the display pixel PXa becomes black. In this case, a voltage of the contact point N2, i.e., a voltage of an anode terminal of the organic light emitting element LD, declines, and after a predetermined time period has elapsed, a voltage of the anode terminal of the organic light emitting element LD converges to a fixed value, which is a threshold voltage Vtho of the organic light emitting element LD. Because the second switching transistor Qs2 sustains a turned on state, the threshold voltage Vtho of the organic light emitting element LD is sensed as a fourth sensing data signal Vtho through the sensing line Sj. Thereafter, the sixth switch SW6 is turned on, the fourth sensing data signal Vtho is input to the analog-to-digital converter 512, and the analog-to-digital converter 512 converts the fourth sensing data signal Vtho and outputs the converted fourth sensing data signal Vtho to a digital value DVtho. This is called a sensing period T3.

The sum of the data writing period T1 and the light emitting period T2 may be equal to a length of the sensing period T3, and the sum of the three periods T1, T2, and T3 is substantially equal to one frame.

A description of FIG. 7, FIG. 8, FIG. 9, and FIG. 10 is a description of the display pixel PXa that performs an actual display operation. In the display pixel PXa, while the fourth sensing data signal Vtho is sensed, a threshold voltage of the organic light emitting element LD of the dummy pixel PXd that does not contribute to a screen display is sensed as a third sensing data signal Vthd. A circuit diagram and an operation thereof are identical to those of FIG. 10. The sensed third sensing data signal Vthd is stored with a digital value DVthd through the analog-to-digital converter 512. A transition degree of the threshold voltage Vtho of the organic light emitting element LD is determined based on the third and fourth sensing data signals DVthd and DVtho in the display pixel PXa, and a degradation factor α representing a degradation degree of the organic light emitting element LD is calculated based on the transition degree. Such a detailed process is identical to a description of the memory 631, the third calculation unit 633, the lookup table 635, and the frame memory 637 of FIG. 3.

A process of sensing threshold voltages Vtho and Vthd of the organic light emitting element LD in the display pixel PXa and the dummy pixel PXd may be performed in every frame, or may be performed in every several frames, and thus the output image signal Dout is corrected. Accordingly, even if a magnitude of the threshold voltage Vtho of the organic light emitting element LD sequentially changes, by allowing a uniform current to flow to the organic light emitting element LD, a uniform image can be displayed.

If a transition degree of the threshold voltage Vtho of the organic light emitting element LD is determined by a predetermined other reference, the reference is a numerical value in which a use environment of the display device, for example a temperature change, is not considered and thus it may be difficult to accurately determine. However, because the organic light emitting device according to an exemplary embodiment of the present invention determines a transition degree of the threshold voltage Vtho of the organic light emitting element LD based on the organic light emitting element LD of the dummy pixel PXd existing within the same display device, in consideration of a use environment of the display device, for example a temperature, a transition degree of the threshold voltage Vtho of the organic light emitting element LD can be determined.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of driving a display device comprising a sensing line, a light-emitting element, a capacitor, and a driving transistor, the driving transistor being connected to the capacitor and comprising a control terminal, an input terminal, and an output terminal, the method comprising:

connecting the control terminal and the output terminal;

connecting the control terminal and the output terminal to a ground voltage and then disconnecting the control terminal and the output terminal from the ground voltage;

sensing a first voltage of the control terminal through the sensing line; and calculating a threshold voltage of the driving transistor based on the first voltage.

2. The method of claim 1, further comprising:

connecting a reference current source to the control terminal and the output terminal;

sensing a second voltage of the control terminal through the sensing line; and calculating an electric field effect mobility of the driving transistor based on the second voltage.

3. The method of claim 2, wherein the driving transistor is a p-channel electric field effect transistor.

4. The method of claim 2, further comprising storing the threshold voltage of the driving transistor and the electric field effect mobility of the driving transistor in a read only memory (ROM).

5. The method of claim 4, wherein the storing of the threshold voltage of the driving transistor and the electric field effect mobility of the driving transistor in the ROM is performed before production of the display device is completed.

6. The method of claim 4, further comprising:

connecting a data voltage to the control terminal; and connecting a reference voltage to the sensing line.

7. The method of claim 6, further comprising:

disconnecting the control terminal from the data voltage and connecting the light-emitting element to the output terminal; and disconnecting the sensing line from the reference voltage and connecting the sensing line to an anode terminal of the light-emitting element.

8. The method of claim 7, further comprising:

disconnecting the light-emitting element from the output terminal;

sensing an anode voltage of the light-emitting element through the sensing line when the light-emitting element is disconnected from the output terminal; and calculating a transition degree of a threshold voltage of the light-emitting element by comparing the anode voltage of the light-emitting element with a reference voltage.

9. The method of claim 8, wherein the reference voltage is an anode voltage of a light-emitting element disposed in a dummy pixel that does not perform a display operation.

10. The method of claim 8, further comprising correcting an input image signal based on the threshold voltage of the driving transistor, the electric field effect mobility of the driving transistor, and the transition degree of the threshold voltage of the light-emitting element.

11. The method of claim 8, wherein sensing the anode voltage of the light-emitting element is performed in more than one frame of the display device.

12. A method of driving a display device comprising a sensing line, a light-emitting element, a capacitor, and a driving transistor, the driving transistor comprising a control terminal that is connected to the capacitor, an input terminal, and an output terminal, the method comprising:

connecting a data voltage to the control terminal;

connecting a reference voltage to the sensing line;

disconnecting the control terminal from the data voltage and connecting the light-emitting element to the output terminal;

disconnecting the sensing line from the reference voltage and connecting the sensing line to an anode terminal of the light-emitting element;

disconnecting the light-emitting element and the output terminal;

sensing an anode voltage of the light-emitting element through the sensing line when the light-emitting element is disconnected from the output terminal; and calculating a transition degree of a threshold voltage of the light-emitting element by comparing the anode voltage of the light-emitting element with a reference voltage.

13. The method of claim 12, wherein the reference voltage is an anode voltage of a light-emitting element disposed in a dummy pixel that does not perform a display operation.

14. The method of claim 12, further comprising correcting an input image signal based on a transition degree of the threshold voltage of the light-emitting element.

15. The method of claim 12, wherein sensing the anode voltage of the light-emitting element is performed in more than one frame of the display device.

* * * * *